(12) United States Patent
Wilms et al.

(10) Patent No.: US 10,390,055 B1
(45) Date of Patent: *Aug. 20, 2019

(54) VIDEO FILE PROCESSING

(71) Applicant: Amazon Technologies, Inc., Seattle, WA (US)

(72) Inventors: Konstantin Wilms, Mission Viejo, CA (US); Justin Michael Binns, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,719

(22) Filed: Jan. 1, 2018

Related U.S. Application Data

(63) Continuation of application No. 14/875,359, filed on Oct. 5, 2015, now Pat. No. 9,860,569.

(51) Int. Cl.
*H04N 21/262* (2011.01)
*H04N 21/234* (2011.01)
*G11B 27/10* (2006.01)

(52) U.S. Cl.
CPC ....... *H04N 21/23418* (2013.01); *G11B 27/10* (2013.01); *H04N 21/262* (2013.01)

(58) Field of Classification Search
None
See application file for complete search history.

(56) References Cited

U.S. PATENT DOCUMENTS

| 9,860,569 | B1 * | 1/2018 | Wilms | H04N 21/23418 |
| 2012/0250755 | A1 * | 10/2012 | Ratner | H04N 19/156 375/240.01 |
| 2012/0266183 | A1 * | 10/2012 | Sandstrom | G06F 9/544 719/312 |
| 2014/0344810 | A1 * | 11/2014 | Wang | G06F 9/455 718/1 |

* cited by examiner

*Primary Examiner* — Eileen M Adams
(74) *Attorney, Agent, or Firm* — Thorpe North & Western, LLP.

(57) ABSTRACT

A technology is described for processing video files using a software container. An example method may include dividing a video file into video segments and distributing the video segments to software containers which provide an isolated environment for a video processing application by creating a virtual container in which the processing application is contained. The video segments are then processed using the video processing application contained in the software containers, and the video file may be reconstructed using processed video segments output by the video processing application.

19 Claims, 11 Drawing Sheets

VIDEO FILE PROCESSING

This application is a continuation of U.S. patent application Ser. No. 14/875,359, filed Oct. 5, 2015, which is incorporated herein by reference.

BACKGROUND

Generally, applications are developed to be installed on a single computing platform, such as an operating system on a server. The applications may be designed to execute on specific computing architectures where computing resources (e.g., processors and memory) may be shared with other applications installed on a server. As a result, application developers may build and assemble applications in anticipation of deploying the applications across a number of different hardware environments that may include public, private, and virtualized servers. Due to the difficulty associated with anticipating interactions with services used by various applications on a server, conflicts may arise within a service that results in poor performance or non-performance of the application.

Software containers may be used to mitigate issues associated with developing and deploying applications across various hardware environments. For example, an application and dependencies utilized by an application may be packed into a software container. The software container may be portable and may enable placement of a software container on servers having different hardware and/or software environments. Thus, a software container may be moved from a private server having one computing architecture to a public server having another computing architecture with minimal impact or even no impact on the application.

DETAILED DESCRIPTION

Figure 1A:
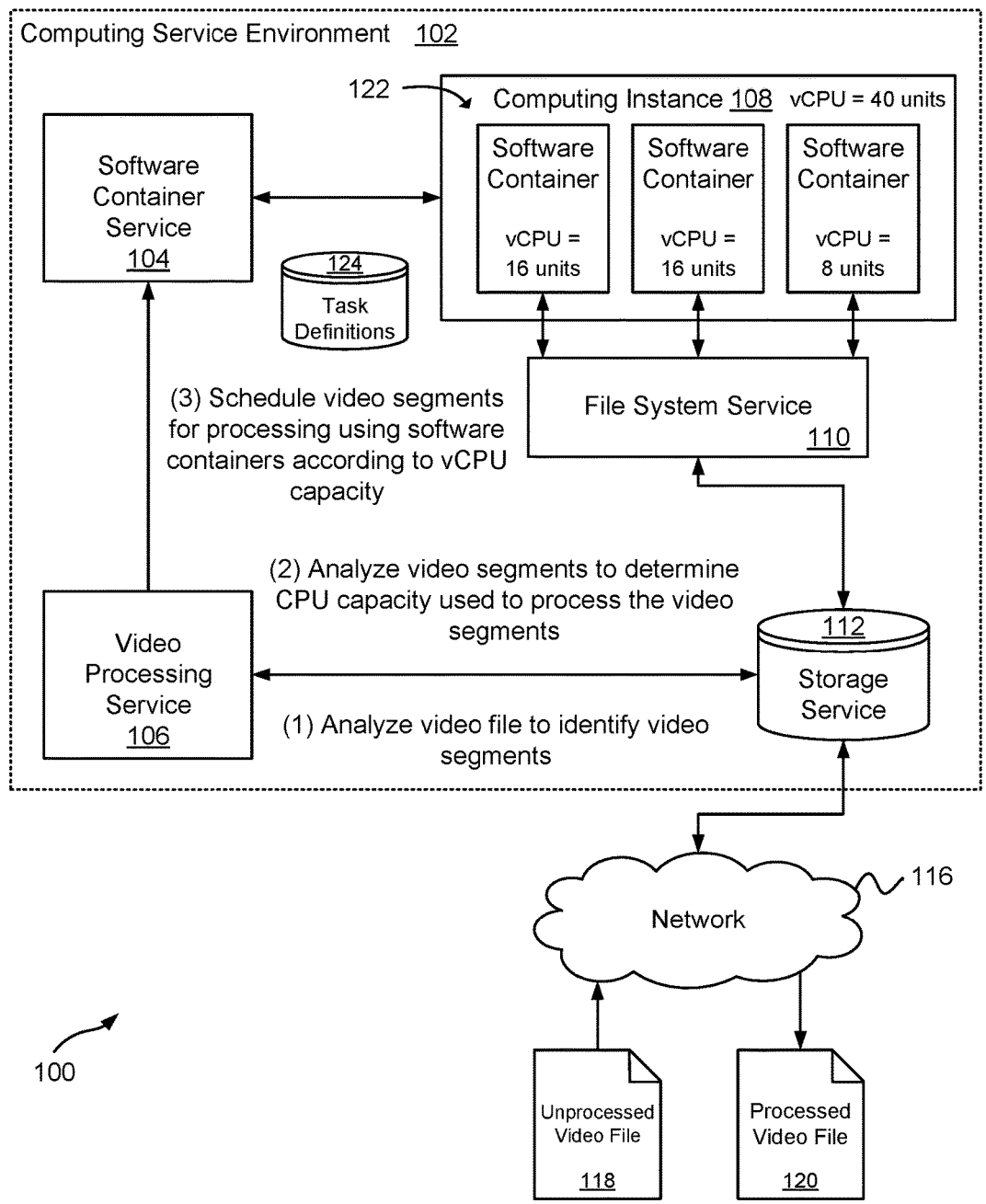
FIG. 1A is a block diagram illustrating an example system for processing video segments using software containers configured with processing capacities that substantially match estimated processing capacities for the video file segments.

A technology is described for processing video files using software containers configured to execute a video processing application. In one example, a video file may be analyzed to identify locations within the video file where the video file may be divided into a number of video segments. The video segments may then be analyzed to determine an estimated amount of processing capacity that may be used to process (e.g., encode, transcode, decode, etc.) the individual video segments using individual software containers included in a software container cluster. Processing capacity or load, in one example, may refer to a virtual processing capacity or load that may be measured using virtual processing units that represent a time slot on a physical processor or a number of processor cycles on the physical processor. The video segments may then be scheduled for processing and distributed among the software containers for processing in parallel according to the estimated processing capacity used to process the video segments.

In one example, a video segment may be assigned to a software container configured with a processing capacity that substantially matches the estimated processing load of the video segment. For example, a software container may be launched for each video segment included in a video file and each video file may be assigned to a specific software container. By assigning video segments to software containers configured with a processing capacity that substantially matches an estimated processing load for the video segments, the video segments may be processed in parallel and processing of the video segments may complete at substantially the same time. In another example, a scheduling scheme may be used that assigns multiple video segments to a software container included in a software container cluster so that the software containers may be substantially fully utilized during the duration of time that the video segments are processed and so that processing of the video segments completes substantially at the same time. For example, scheduling the video segments may be done so that few, if any, software containers in the software container cluster are idle during processing of the video segments, and that processing may be completed at a deterministic estimated completion time (e.g., according to customer expectations, billing system procedures, etc.).

The video segments may be processed using a video processing application executed within the software containers. The software containers may contain the video processing application and application dependencies that when executed process the video segments. After the video segments have been processed, the video file may be reconstructed using the processed video segments. For example, the video file may be reconstructed by appending the individual video segments to one another in a sequential order on a storage medium.

In the past, parallel video processing that has been performed using a computing cluster (e.g., a cluster of computing instances) may have utilized a video processing scheduler that executes on each computing node of the computer cluster. Because each prior computing node included its own video processing scheduler, video segments included in a video file may not have been distributed among computing nodes so that each computing node was fully utilized, resulting in computing nodes that may have been idle while other computing nodes were actively processing video segments. Also, video may have been processed using single computing instances or clusters by serializing processing of entire video files rather than individual video segments within the video file, thus leading to unused compute capacity for long-running processing tasks.

Today's processors may have an increasing amount of processing capacity that may exceed a processing capacity that codecs may be configured to utilize. For example, the H.264 codec may only utilize 16 threads on a 40-core (80 hyperthread) computing instance. Consequently, schedulers have had to either allow for unused resources or attempt to implement complex logic to best-effort schedule new tasks as processing capacity becomes available, and may have to poll computing instances for processing availability, which may have resulted in over-provisioning computing resources in order manage variances in task workloads.

As a result of the current technology, a centralized video processing service (e.g., a scheduler executing as part of a computing instance cluster) may be used to schedule video segments for processing using software containers included in a software container cluster so that the software containers may be substantially fully utilized in processing the video segments. As such, the software container cluster may be more efficiently utilized making the software container cluster available for additional video processing tasks.

FIG. 1A is a diagram illustrating a high level example of a system 100 that may be used to process (e.g., encode, convert, decode, transcode, and analyze pre-processing and/or post-processing) video files 118. The system 100 may include a computing service environment 102 that uses virtualization to allow a single physical server computer to host multiple computing instances 108 (e.g., virtual guest machines) and other virtualization schemes (e.g., virtualized storage, virtualized networking, etc.) using a hypervisor, virtual network, or the like. A computing instance 108 may host software containers 122 that provide an isolated environment for a video processing application on the computing instance 108 by creating a virtual container in which the video processing application and video processing application dependencies are contained. The software containers 122 may be clustered so that video segments may be processed in parallel using the video processing application(s) contained in the software containers 122.

The computing service environment 102 may also host a video processing service 106, a storage service 112, a file system service 110, and a software container service 104 configured to manage software containers 122. The video processing service 106 may be configured to manage processing of video files 118 that may be processed using a video processing application or applications executed using software containers 122. For example, the video processing service 106 may be used to schedule video segments for processing by distributing the video segments among software containers 122 for processing so that each of the software containers 122 may be substantially fully utilized and processing of the video segments completes close in time (e.g., processing completes at a deterministic estimated completion time).

In one example, a video file 118 may be uploaded via a network 116 to a staging location provided by the storage service 112 with instructions for processing the video file 118. Illustratively, the processing instructions for the video file 118 may be instructions to encode the video file 118 (e.g., compress the video using a video codec) or transcode the video file 118 (convert the video from one video codec to another video codec). The staging location provided by the storage service 112 may be accessible to customers of a computing service provider, allowing the customers to upload video files 118 to the staging location.

The storage service 112, in one example, may include a notification feature that generates a notification and sends the notification to the video processing service 106 when a video file 118 has been uploaded to the storage service 112. For example, a push messaging service may be used to notify the video processing service 106 that a video file 118 has been uploaded. In another example, the video processing service 106 may be configured to periodically poll (query) the storage service 112 to determine whether a video file 118 has been uploaded to the storage service 112. In yet another example, uploading a video file 118 to the storage service 112 may result in generating an event (e.g., a script) that transfers the video file 118 from the staging location in the storage service 112 to a file in the file system service 110, whereupon the video processing service 106 may be notified that the video file 118 has been transferred.

In determining that a video file 118 has been uploaded to the storage service 112, the video processing service 106 may be configured to execute instructions that transfer the video file 118 from the storage service 112 (e.g., an object storage service accessible to customers) to a file system service 110 (e.g., a scalable file system service) that may be accessible to the computing instance 108 and the software containers 122 hosted on the computing instance 108. Illustratively, multiple software containers 122 can access the file system service 110 simultaneously, thereby providing a common data source for workloads and applications executing on more than one software container 122. More specifically, a video file 118 contained in the file system service 110 may be accessible to each of the software containers 122 included in a software container cluster prepared to process the video file 118.

Video files 118 uploaded to the computing service environment 102 for processing may be divided into multiple video segments with related or un-related frames, where the video segments may be processed in parallel using the software containers 122. Illustratively, a video file 118 may be divided into video segments at a file level, transport level (e.g., boundary MPEG packet seeks within a video file 118), or codec level (e.g., video elementary stream (ES) MPEG GOP seek) based in part on the how an encoder is configured to process the video file 118. For example, a video file 118 may be divided at a file level using the video processing service 106 configured to analyze a video file 118 and identify offset locations in the video file 118 using Group of Picture (GOP) structures, bitrates, iframes (intra coded picture), scene changes, and the like, that may be identified and used to divide the video file 118 into video segments. A list of video segments (e.g., a video segment index) may then be generated based on the offset locations identified that logically divide the video file 118 into the video segments. As a non-limiting example, a video file 118 may be analyzed to identify GOP structures (e.g., an order in which intra-frames and inter-frames are arranged) included within the video file 118 and the video file 118 may be logically divided into video segments according to the offset locations of the GOP structures identified. In another non-limiting example, a video file 118 that has a variable bit rate may be analyzed to identify offset locations within the video file 118 where the bit rate changes and the offset locations where the bit rate changes may be used to logically divide the video file 118 into video segments.

In one example, offset locations may be byte offsets and a video segment may be obtained by performing a byte order seek of the video file 118. In another example, using a block size of a video segment and an offset for the video segment, the video segment may be retrieved from the video file 118. In yet another example, the file system service 110 may store the video file using addressed video segments and a video segment may be retrieved using an address of a video segment.

In an alternative example, a video file 118 may be analyzed to identify byte offset locations in the video file 118 as described above and the video file 118 may be physically divided into multiple video segments at the byte offset locations. For example, a video file 118 may be divided into video segments and the video segments may be placed in one or more file folders in the file system service 110 which may be accessible to the software containers 122.

An amount of processing capacity (e.g., virtual CPU (Central Processing Unit) units) used to process one video segment included in a set of video segments may differ from an amount of processing capacity used to process another video segment included in the set of video segments. For example, one virtual CPU unit may be used to process a first video segment, whereas five virtual CPU units may be used to process a second video segment. Illustratively, a virtual CPU unit may be a time slot on a physical processor or a number of processor cycles on a physical processor. A number of CPU units used to process a video segment may be based on factors that include a number of frames that are included in one or more GOP structures of the video segment, a bit rate of the video segment, motion vector data for the video segment, peak signal-to-noise ratio (PSNR) for the video segment, a codec type associated with encoding or transcoding the video segment, the type of video processing applied (e.g., filtering or effect application), as well as other factors. Because video segments included in a video segment set may have different GOP structures, bit rates, motion vectors, PSNRs, etc., a number of virtual CPU units needed to process the video segments may vary.

The video processing service 106 may be configured to calculate an estimated amount of processing load (e.g., a number of virtual CPU units) that may be used to process video segments included in a video segment set. In one example, software containers 122 configured to execute a CPU estimation application may be used to calculate an estimated amount of processing load as described in relation to FIG. 5. In calculating an estimated processing load created by each video segment included in a video segment set, the various features of the video segments may be used, such as GOP structures, bit rates, motion vectors, and PSNRs, along with codec and/or encoding parameters and overhead associated with processing the video segments. For example, an estimated number of virtual CPU units may be calculated for a video segment based on the bit rate of the video segment, the codec used to encode the video segment, and features of computing resources used to process the video segment.

After an estimated processing load has been calculated for each video segment included in a video file 118, the video processing service 106 may be configured to schedule the video segments for processing according to the estimated processing load for the video segments and the processing capacity in software containers 122. More specifically, the video segments may be processed using software containers 122 that execute a video processing application and each software container 122 may be configured with a processing capacity that substantially matches the estimated processing capacity used to process an individual video segment with a defined processing load.

In one example, the video processing service 106 may be configured to determine how many software containers 122 may be needed to process video segments included in a video file 118 and determine types and configurations for the software containers 122 (e.g., type of video processing application and/or amount of processing capacity) to launch. As described earlier, a video processing application and dependencies utilized by the video processing application may be packed into a software container 122. A video processing application may be used to encode a video segment using a specified codec (e.g., MPEG-4, H.265, etc.), or may be used to transcode a video segment from one encoding to another specified encoding (e.g., Phase Alternative Line (PAL) to MPEG-4).

A software container 122 that contains the video processing application may be configured, via a task definition 124, to utilize a defined amount of processing capacity (virtualized CPU units) and memory capacity. A task definition 124 used to launch a software container 122 may specify a software container image, a virtual CPU allocation, a memory allocation, a reference (e.g., a local path or a hash key) to the video file 118 stored in the file system service 110, byte offsets to one or more video segments assigned to the software container 122, environment variables, as well as other parameters. The software container service 104 may evaluate the task definitions 124 and launch a specified number of software containers 122 for each task definition 124 specified. Processing capacity, for example, may be virtualized CPU units that represent time slots or a number of processor cycles for a physical processor used to execute virtualized components (e.g., software containers 122) within the computing service environment 102 and the virtualized CPU units may be allocated to the virtualized components. A virtualized component (e.g., a software container 122) may then utilize the allocated virtualized CPU units to perform some task.

Thus, in determining the types of software containers 122 to launch, the video processing service 106 may be configured to: evaluate processing parameters that may be submitted with a video processing task and identify one or more video processing applications that may be used to process video segments included in a video file, evaluate estimated processing loads created by each video segment and identify software container types configured with processing capacity allocations that substantially match the estimated processing loads generated by the video segments, and evaluate the size of the video segments to determine an estimated amount of memory needed to process each video segment and identify software container types configured with memory size allocations that correspond with the estimated amounts of memory. As a specific example, an evaluation of an individual video segment associated with a parameter to encode the video segment using a MPEG-4 codec may show that an estimated two units of virtual CPU and five megabytes of memory may be used to process the video segment. As such, a software container type (e.g., a software container image) may be identified to execute a video processing application that encodes video using the MPEG-4 codec and is allocated at least two units of virtual CPU and five megabytes of memory.

In one example, a weighted order list of video segments may be created by weighting the video segments according to the estimated amount of processing load and ordering the video segments according the weightings. The weighted order list may then be used to identify task definitions 124 that may be used to launch the software containers 122. For example, the weighted order list of video segments may specify estimated amounts of processing capacity used to process each of the video segments, and task definitions for launching processing capacities that substantially match the estimated processing load may be identified and launched by the software container service 104. In another example, the software container service 104 may be instructed to modify the processing capacities of software containers 122 to correspond to estimated amounts of processing capacity used to process the video segments. For example, a processing capacity parameter of a task definition 124 may be modified to correspond with a video segment's estimated amount of processing load. As a specific example, a task definition 124 for a software container 122 that allocates four virtual CPU units to a software container 122 may be modified to correspond to an estimated processing load (two virtual CPU units) of a video segment assigned to the software container 122.

After identifying software container types to launch, a calculation of how many software containers 122 of each type to launch may be made, with the objective being to substantially fully utilize the software containers 122 in processing the video segment set and to finish processing of the video segments included in the video segment set close in time (e.g., according to a scheduling scheme or within a defined time window). In one example, a number of software containers 122 of each type may be launched according to a scheduling scheme that assigns the video segments to the software containers 122 so that the software containers 122 are substantially fully utilized during the duration of time that the video segments are processed and with the intent that the processing of the video segments completes substantially at the same time. In another example, the number of software containers 122 of each type that may be launched may be based on completing processing of the video segment set within a certain time window (e.g., 2, 5, or 7 minutes). In yet another example, a software container 122 may be launched for each video segment included in a video file 118 (e.g., launch 75 software containers 122 for a video file 118 containing 75 video segments).

The video processing service 106 may be configured to instruct the software container service 104 to launch the software containers 122 on one or more computing instances 108 and provide each software container 122 with instructions to retrieve and process one or more video segments. For example, the video processing service 106 may pass task definitions 124 used to launch the software containers 122 to the software container service 104, which may then launch the software containers 122 using the specifications of the task definitions 124.

Each software container 122 launched may be configured with a processing capacity that substantially corresponds with an estimated processing load for a video segment assigned to the software container 122 with a specified processing capacity. Thus, in the case that a video file 118 includes video segments having estimated computing loads of one unit, two units, and five units of virtual CPU, software containers 122 that have been allocated one unit, two units, and five units of virtual CPU processing capacity may be assigned to the software containers 122 according to the estimated computing load of each video segment.

In one example, virtual CPU units allocated by a hypervisor to a computing instance 108 that hosts the software containers 122 may be allocated to the software containers 122 so that the combined processing capacity distributed among the software containers 122 may be aligned with the processing capacity allocated to the computing instance 108. As a specific example, forty virtual CPU units allocated to a computing instance 108 may be distributed among three software containers 122 hosted by the computing instance 108, such that sixteen virtual CPU units may be allocated to the first software container; sixteen virtual CPU units may be allocated to the second software container; and eight virtual CPU units may be allocated to the third software container.

In another example, an existing cluster of software containers 122 may be analyzed to determine whether the existing software containers 122 may be used to process a video file 118. For example, a video file 118 waiting to be processed may be staged in the storage service 112 while a software container 122 cluster is being used to process another video file. When the software container 122 cluster becomes available, rather than terminating the software containers 122 and launching new software containers for the next processing video processing task, the existing software container 122 cluster may be analyzed to determine whether the software containers 122 may be used to process the next video file 118 staged in the storage service 112. In analyzing the existing software container 122 cluster, a determination may be made whether the specifications of software containers 122 (e.g., video processing application, allocated processing capacities, and memory) correspond to specifications for processing the next staged video file 118, and in the case that the specifications correspond, the video file 118 may be processed using the existing software containers 122.

In yet another example, a processing load score representing an estimated processing load of an individual video segment may be assigned to each video segment included in a video file 118. The video segments may then be grouped into multiple groups so that a sum of processing load scores for video segments included in a video segment group may be substantially equal to a processing load score for a software container 122, as described in greater detail in relation to FIG. 8. Other methods that may be used to schedule video segments for parallel processing using software containers 122 according to processing capacities associated with the video segments and the software containers 122 not described in detail here are also within the scope of this disclosure.

In assigning the video segments to the software containers 122, the video processing service 106 may be configured to provide instructions for obtaining and processing the video segments. For example, the video processing service 106 may be configured to identify video segment byte offsets for a video segment in a video file 118 (e.g., using a video segment index) and provide the video segment byte offsets to a software container 122 assigned to process the video segment. For example, as part of instructing the software container service 104 to launch a software container 122 using a task definition 124, the video processing service 106 may be configured to include the video segment byte offsets as parameters included in the instructions to launch the software container 122. After the software container 122 is launched, instructions executed using the software container 122 may retrieve the video segment using the video segment byte offsets from the video file 118 stored in the file system service 110. For example, the video file 118 may be accessible to the software container 122 via the file system service 110 and the software container 122 may be configured to execute instructions that perform a byte order seek of the video file 118 and obtain the video segment from the video file 118.

A video segment retrieved using a software container 122 may be processed using a video processing application executed by the software container 122. Processing of video segments may be performed in parallel using the software containers 122. As such, processing of the video segments may complete substantially close in time as a result of scheduling the video segments for processing according to the processing load of the video segments.

When processing of a video segment completes, a software container 122 used to process the video segment may be configured to write the processed video segment back to the file system service 110 and send a completion code to the video processing service 106 that indicates that the video segment has been processed. After each video segment included in the video segment set has been processed, the video processing service 106 may be configured to reconstruct the video file 120 using the processed video segments output by the software containers 122 and the video file 120, in one example, may be transferred to the storage service 112 where the video file 120 may be accessible to the owner of the video file 120.

Figure 1B:
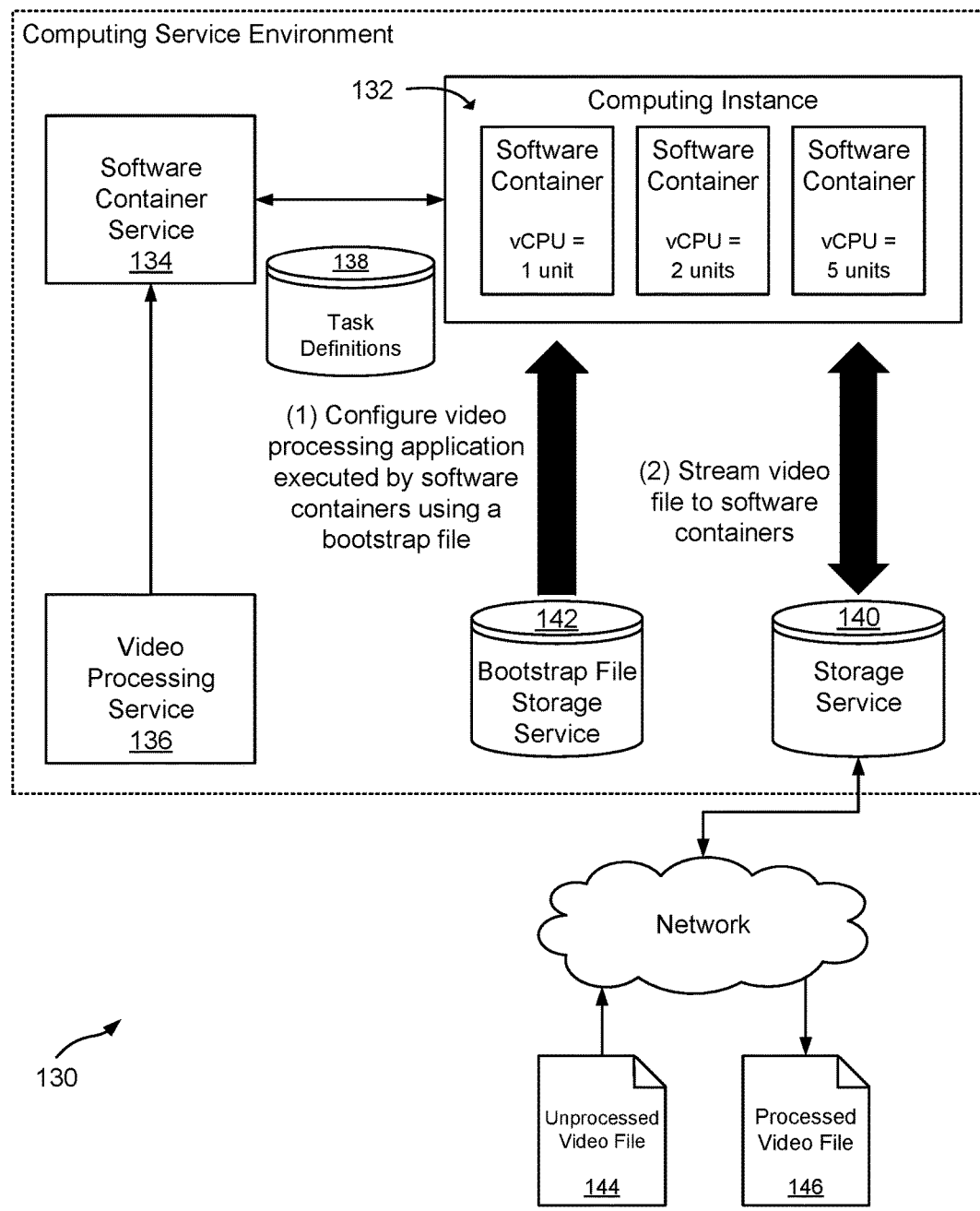
FIG. 1B is a block diagram that illustrates an example system for processing video segment using software containers configured in part using a bootstrap file.

FIG. 1B is a diagram that illustrates a high level example of a system 130 that may be used to process video files 144 using software containers 132 that may be launched using task definitions 138 and configured in part using bootstrap files stored in a bootstrap file storage service 142. A bootstrap file may include specifications for a video processing application, such as encoding specifications or transcoding specifications. For example, a bootstrap file may specify that a video processing application encode video segments using a specific codec (e.g., H.264 codec or H.265 codec). Consequently, using a bootstrap file to configure a video processing application may avoid the use of multiple software containers 132 that execute different video processing applications (e.g., a first software container executing an H.262 video processing application, a second software container executing an H.264 video processing application, a third software container executing an H.265 video processing application, etc.). Instead, the software containers 132 may execute a standard video processing application that may be configured to process multiple types of video using various codecs using an application configuration specified in a bootstrap file.

Illustratively, a video processing service 136 may be configured to identify task definitions 138 for software containers 132 that may be used to process a video file 144. Included in a task definition 138 as an environment variable may be a reference to a bootstrap file stored in a bootstrap file storage service 142. The task definition 138 may be passed to a software container service 134 that launches the software container 132 using the task definition 138. When the software container 132 launches, the bootstrap file may be obtained from the bootstrap file storage service 142 and the video processing application executed by the software container 132 may be configured to process the video file 144 using a codec specified in the bootstrap file.

In another example, video file segments may be streamed to the software containers 132 for processing using technologies like HTTP Live Streaming (HLS Live Stream) or Dynamic Adaptive Streaming over HTTP (MPEG DASH) that break a video file stream into a sequence of small HTTP-based file downloads that may be distributed to the software containers 132. For example, video segments included in a video file 144 may be streamed from the storage service 140 to the software containers 132 that process the video segments using a video processing application, and the processed video segments may be streamed back to the storage service 140 and the video file 146 may be reconstructed using the processed video segments.

Figure 2:
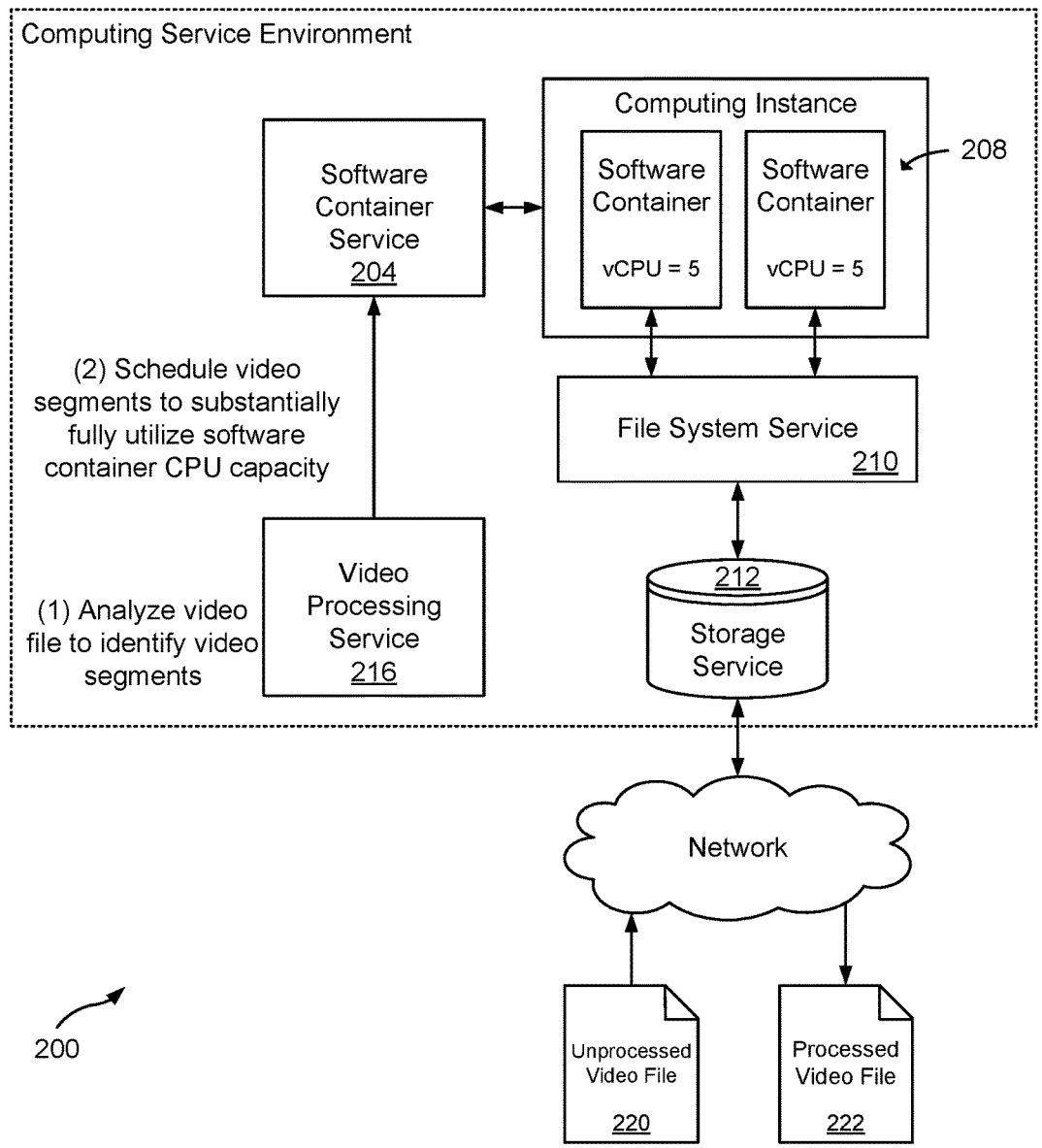
FIG. 2 is a block diagram that illustrates an example system for processing video segments using software containers configured with a uniform processing capacity.

FIG. 2 is a diagram illustrating another high level example of a system 200 that may be used to process video files 220 using software containers 208 configured with a uniform amount of processing capacity. For example, each software container 208 included in a software container cluster used to process video segments of a video file 220 may be allocated a same amount of processing capacity and a video processing service 216 may be configured to schedule video segments for processing using the software containers 208 so that the processing capacity of the software containers 208 may be substantially fully utilized.

A number of software containers 208 included in a software container cluster configured with a uniform amount of processing capacity may be based on factors that may include: cost, processing time, resource availability, as well as other factors. As an example, a number of software containers 208 used to process a video file 220 may be based in part on a cost to launch and use a software container 208. For example, a customer may launch as many software containers 208 as monetary cost constraints will allow.

In another example, a number of software containers 208 included in a software container cluster may be scaled according to various factors. In one example, a number of software containers 208 included in a software container cluster may be scaled based in part on a customer specified time period in which to complete processing of a video file 220. For example, a customer may submit a video file 220 for processing along with a time period (e.g., 2, 5, or 7 minutes) in which to complete processing of the video file 220. The video processing service 216 may be configured to analyze the video file 220 and identify a number of software containers 208 having standard amounts of allocated processing capacity that may be used to process the video file 220 within the specified time period. A software container cluster may then be scaled up or down to include the number of software containers 208 identified.

In another example, a number of software containers 208 included in a software container cluster may be scaled based in part on a customer budget constraint on a monetary cost of the software containers 208. For example, the cost of some software containers 208 may fluctuate over a period of time and software containers 208 included in a software container cluster may be dropped or added according to the cost of the software containers 208 and the customer budget constraint. As a more specific example, a customer may place bids on spot computing instances that may be executed using currently unoccupied computing capacity and the spot computing instances may be used to execute one or more software containers for a short term. At a time that the bid placed by the customer exceeds a spot price for the spot computing instance, the customer's bid may be accepted and the customer may have access to the spot computing instance until such a time that the spot price moves above the bid price and the spot computing instance may be reclaimed. As such, the customer may obtain a spot computing instance to scale up software containers 208 used to process video files 220 and scale down the number of software containers 208 when spot prices exceed the customer's budget constraint. In scaling down a number of software containers 208 included in a software container cluster, processing tasks assigned to software containers 208 that are terminated may be reassigned to other software containers 208.

In addition to the video processing service 216, the system 200 may include a software container service 204, a storage service 212, and a file system service 210 as described in relation to FIG. 1. In scheduling a video file 220 for processing, the video processing service 216 may be configured to analyze the video file 220 to identify video segments as described earlier. The video segments may then be scheduled to be processed using a scheduling scheme that that assigns the video segments to the software containers 208 so that the software containers 208 may be efficiently utilized during the duration of time that the video segments are processed and so that processing of the video segments completes substantially at the same time. A more detailed example is provided later in relation to FIGS. 7 and 8. After the video segments have been processed, the video file may be reconstructed using the processed video segments and the processed video file 222 may be transferred to the storage service 212 where the processed video file 222 may be accessible to the video file owner.

The systems described in relation to FIGS. 1A, 1B, 2 may alternatively be used to process imaging files, including graphic images (e.g., 2D (dimensional) and 3D imaging), rendering 3D graphical environments used for games, simulations or special effects, photography images, as well as other types of images. Namely, an image file may be logically divided into imaging segments, which may be distributed to software containers and processed, and the image file may be reconstructed using the processed imaging segments.

Figure 3:
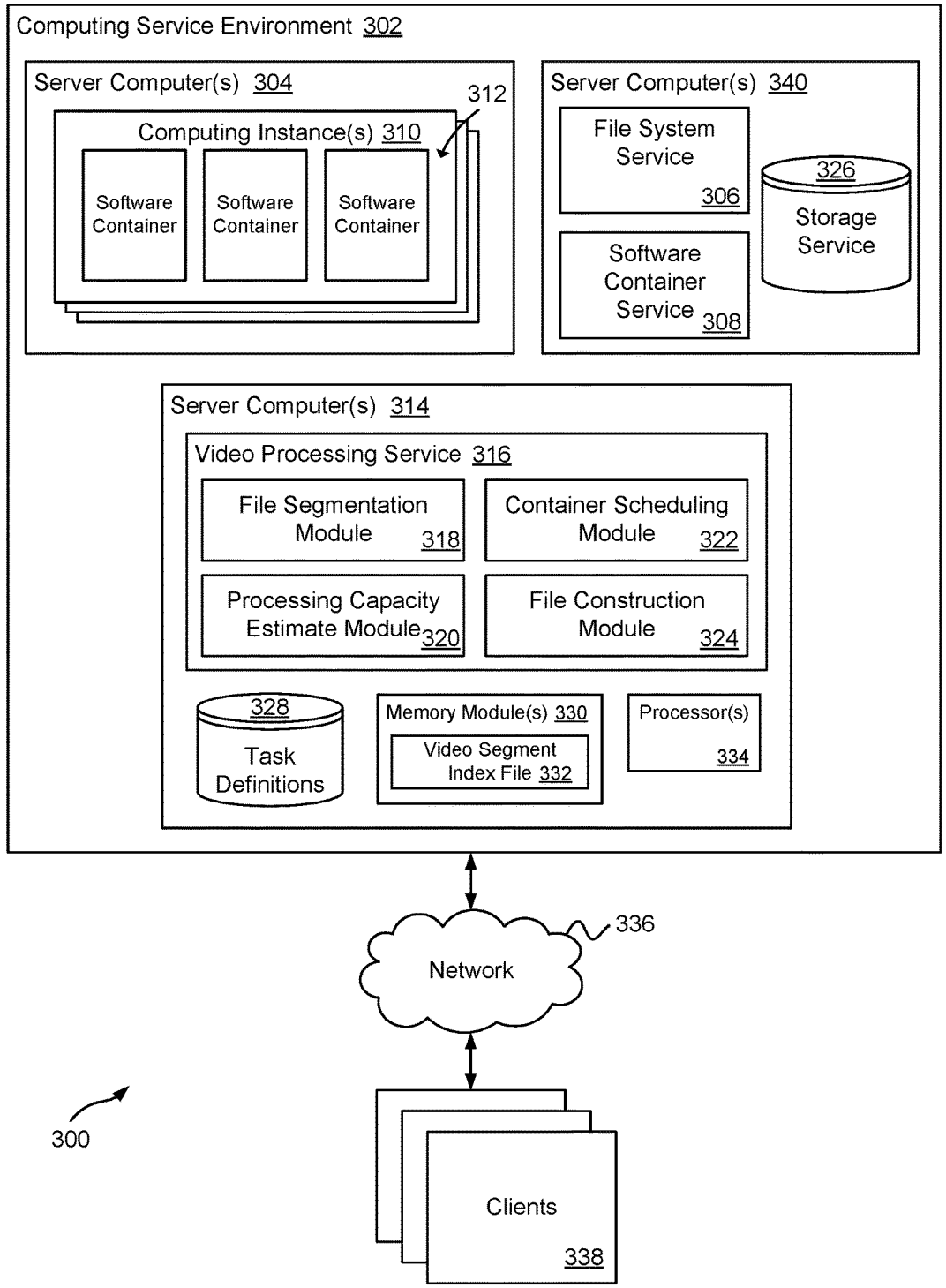
FIG. 3 is a block diagram that illustrates various example components included in a system for processing video files using software containers that execute a video processing application.

FIG. 3 illustrates components of an example system environment 300 on which the present technology may be executed. A computing service environment 302 may include one or more server computers 304, 340, and 314. The one or more server computers 304 may host computing instances 310 on which software containers 312 may be executed. The one or more server computers 340 may host a file system service 306 configured to provide a common data source for accessing video files by applications executing within the software containers 312, a software container service 308 configured to manage software container clusters, and a storage service 326 configured to manage the storage and retrieval of data.

In one example, the storage service 326 may be an object storage system in which a staging location may be defined for video files that are waiting processing. Video files staged in the storage service 326 may be moved to the file system service 306 where the video files may be accessible to the video processing service 316 and the computing instances 310 that host software containers 312.

The one or more server computers 314 may host a video processing service 316 that includes a file segmentation module 318, a processing capacity estimate module 320, a container scheduling module 322, and a file construction module 324. The file segmentation module 318 may be configured to logically divide a video file into multiple video segments. In one example, a video file may be analyzed to identify offset locations in the video file using Group of Picture (GOP) structures, bitrates, iframes (intra coded picture), scene changes, and the like that may be used to logically divide the video file into video segments. A video segment index file 332 containing an index of video segments may then be created using the offset locations identified. The video segment index file 332 may be referenced when assigning a software container 312 a video segment to process.

The processing capacity estimate module 320 may be configured to calculate an estimated amount of processing capacity that may be used to process an individual video segment. An estimated amount of processing capacity may be calculated for each video segment included in a video file. In calculating an estimated processing capacity for an individual video segment, various features of the video segment may be analyzed, such as GOP structures, bit rates, motion vectors, and PSNRs, along with output codecs and/or encoding parameters and system overhead associated with processing the video segment and the estimated processing capacity may be calculated based on the features. In some examples, a calculation of processing capacity may also be based on a type of processor resources needed to process a video segment, such as a Floating Point Unit (FPU), CPU execution bits (e.g., INTEL AVX, MMX, SSE), and resource alignment (RAM and bus speed, etc.). In one example, the processing capacity estimate module 320 may be configured to generate a weighted order list of estimated amounts of processing capacity for the video segments and the weighted order list may be used by the container scheduling module 322 to identify task definitions 328 for software containers 312 configured with processing capacity that correspond to the estimated processing capacities included in the weighted order list.

The container scheduling module 322 may be configured to identify software containers 312 (e.g., as defined by task definitions 328) that may be used to process video segments, instruct the software container service 308 to launch or obtain the software containers 312, and schedule and assign video segments to the software containers 312 for processing. For example, based on the processing schemes used to process a video file described earlier, task definitions 328 for software containers 312 may be identified or created and video segments may be assigned to the software containers 312. The task definitions 328 may be passed to the software container service 308 with instructions to launch a specified number of software containers 312 using the task definitions 328. The task definitions 328 may specify a software container image, a processing capacity allocation, a memory allocation, a reference (e.g., a local path) to the video file, and video segment byte offsets for one or more video segments assigned to the software container 312.

The software container service 308 may be configured to evaluate task definitions 328 that are passed to the software container service 308 and launch a specified number of software containers 312 for each task definition 328 according to instructions received from the container scheduling module 322. The software containers 312 (via a video processing application) may process the video segments by retrieving the video segments from the video file stored in the file system service 306, process the video segments (e.g., encode or transcode the video segments), and store the processed video segments back to the file system service 306.

The file construction module 324 may be configured to reconstruct a video file using processed video segments generated by the software containers 312. In one example, the software containers 312 (via a video processing application) may be configured to generate a completion code that indicates that processing of a video segment is complete. The completion code may be sent to the video processing service 316 and upon receiving a completion code for each video segment of a video file, the file construction module 324 may be used to retrieve the processed video segments from the file system service 306 and construct a processed video file by appending the processed video segments to one another in a sequential order. The processed video file may then be stored to the storage service 326 where the processed video file may be retrieved by a video file owner.

A customer may utilize a client 338 to the access video processing service 316 and the storage service 326. A client 338 may include any device capable of sending and receiving data over a network 336. A client 338 may comprise, for example a processor-based system such as a computing device. A client 338 may be a device such as, but not limited to, a desktop computer, laptop or notebook computer, tablet computer, mainframe computer system, handheld computer, workstation, network computer, or other devices with like capability.

The various processes and/or other functionality contained within the system environment 300 may be executed on one or more processors 334 that are in communication with one or more memory modules 330. The system environment 300 may include a number of computing devices that are arranged, for example, in one or more server banks or computer banks or other arrangements. The computing devices may support a computing environment using hypervisors, virtual machine monitors (VMMs) and other virtualization software. A data store may be used to store video files, task definitions, and other data. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 336 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
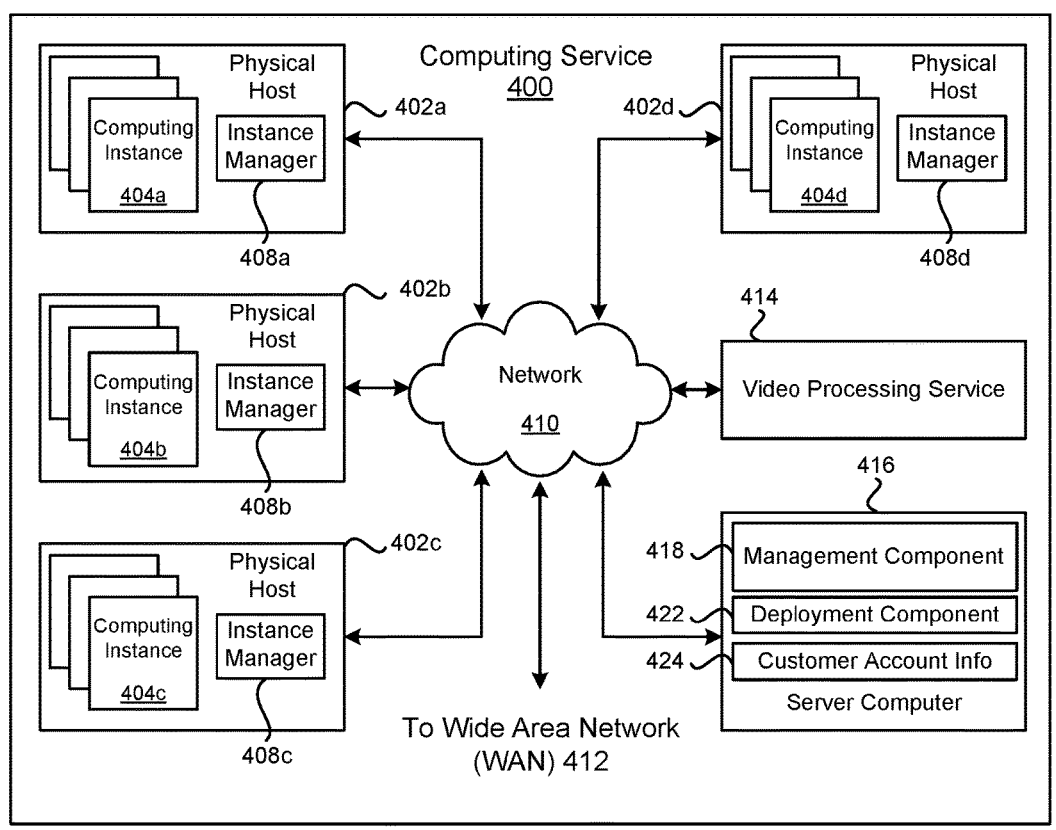
FIG. 4 is a block diagram that illustrates an example computing service environment that includes a video processing service.

FIG. 4 is a block diagram illustrating an example computing service 400 that may be used to execute and manage a number of computing instances 404*a-d* that may be used to execute software containers. In particular, the computing service 400 depicted illustrates one environment in which the technology described herein may be used. The computing service 400 may be one type of environment that includes various virtualized service resources that may be used, for instance, to host computing instances 404*a-d*. One or more software containers may be launched on the computing instances 404*a-d*.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e. a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine monitor (VMM), or another type of program configured to enable the execution of multiple computing instances 404*a-d* on a single server. Additionally, each of the computing instances 404*a-d* may be configured to execute one or more applications.

One or more server computers 414 and 416 may be reserved to execute software components for managing the operation of the computing service 400 and the computing instances 404*a-d*. A server computer 414 may also execute a video processing service that may be used to encode and/or transcode video files using software containers that may be launched on the computing instances 404*a-d*.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d. Further, the management component 418 may be used by a customer to configure various aspects associated with software containers that execute on the computing instances 404a-d. In some examples, serverless or infrastructureless code that may be triggered as a result of an occurrence of an event may be used to manage and/or configure aspects of the operation of the computing instances 404a-d.

A deployment component 422 may be used to assist customers in the deployment of computing instances 404a-d and software containers. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
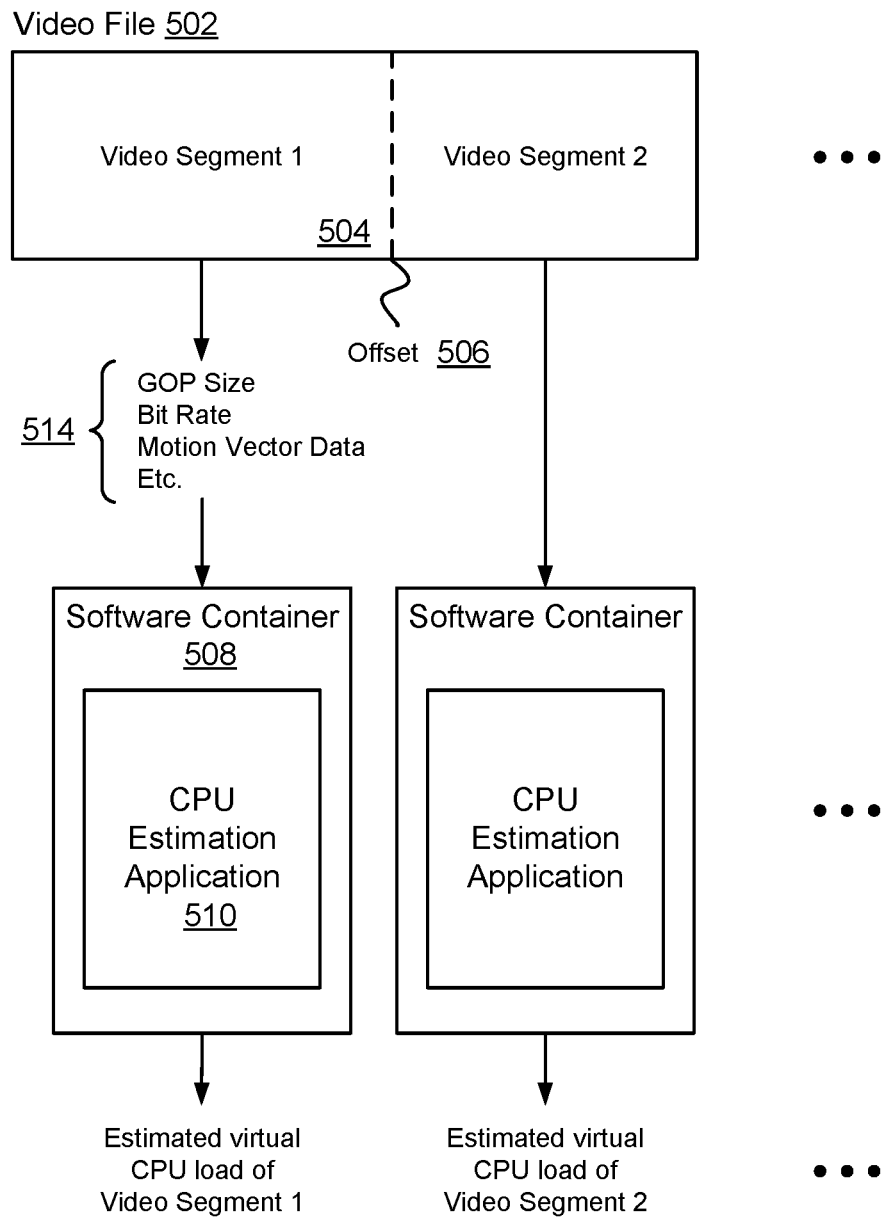
FIG. 5 is a diagram illustrating an example schematic for calculating an estimated amount of processing load for a video segment using video encoding attributes of the video segment.

FIG. 5 is a diagram that illustrates an example method for calculating an estimated amount of processing capacity for a video segment 504 of a video file 502 using a CPU estimation application 510 executed by a software container 508. As described earlier, a video file 502 may be logically divided into multiple video segments based in part by identifying GOP structures, bitrates, iframes, scene changes, and the like in the video file 502 and identifying offsets 506 that may be used to identify the individual video segments. The resulting video segments may be of various sizes and may include various levels of high motion video data and low motion video data.

A video segment 504 may be analyzed to identify video encoding attributes that may be used to calculate an estimated amount of processing capacity that may be needed to process the video segment 504. Video encoding information 514 associated with the video encoding attributes may be placed in corresponding video segment metadata fields and the video segment metadata fields may be provided to the CPU estimation application 510. The CPU estimation application 510 may use the video encoding information 514 and other information (e.g., output codec and overhead information) to calculate an estimated amount of processing capacity for the video segment 504. Examples of video encoding information 514 that may be included in video segment metadata fields may include: a GOP structure of a video segment 504, a bit rate of the video segment 504, motion vector data for the video segment 504, peak signal-to-noise ratio (PSNR) for the video segment 504, as well as other video encoding information 514.

The video segment metadata fields may then be provided to a software container 508 that calculates an estimated amount of processing capacity (via the CPU estimation application 510) for the video segment 504 using the video encoding information 514 included in the video segment metadata fields. In one example, a software container cluster containing multiple software containers 508 configured with a CPU estimation application 510 may be used to calculate estimated amounts of processing capacity for the video segments 504 of a video file 502. Illustratively, a software container 508 may be used to calculate estimated amounts of processing capacity for multiple video segments 504, or as illustrated in FIG. 5, individual video segments 504 may be assigned to individual software containers 508 in a software container cluster that calculate an estimated amount of processing capacity for the individual video segments 504.

Figure 6:
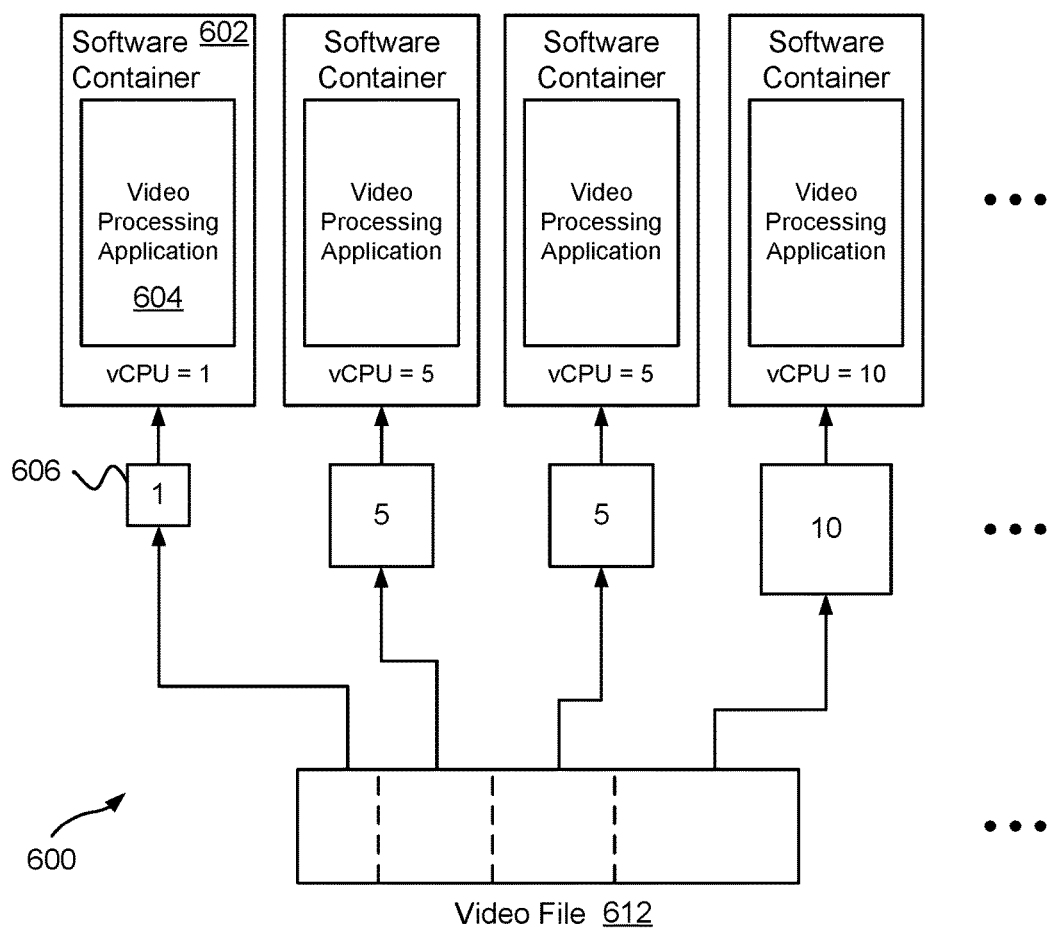
FIG. 6 is a diagram that illustrates an example schematic for scheduling a video segment for processing using a software container according to an estimated amount of processing capacity used to process the video segment.

FIG. 6 is a diagram illustrating an example method 600 for scheduling a video segment 606 for processing using a video processing application 604 executing in a software container 602 according to an estimated amount of processing capacity used to process the video segment 606. In this example, a software container may be identified and launched for each video segment included in a video file 612. For example, video encoding information (e.g., GOP structure) for a video segment 606 may be analyzed to determine an estimated amount of processing capacity (e.g., 1, 5, or 10 virtual CPU units) that may be used to processes the video segment using a software container 602, as described earlier. Using the estimated amount of processing capacity (e.g., 1, 5, or 10 virtual CPU units) for the video segment 606, as well as other factors, a task definition for a software container 602 that includes a parameter for allocated processing capacity (e.g., 1, 5, or 10 virtual CPU units) that substantially corresponds to the estimated amount of processing capacity (e.g., 1, 5, or 10 virtual CPU units) may be identified and the software container may be launched. The software container 602 may be assigned the video segment 606 by providing video segment offsets to the software container 602 and the software container 602 may obtain the video segment from a video file 612 using the video segment offsets.

Figure 7:
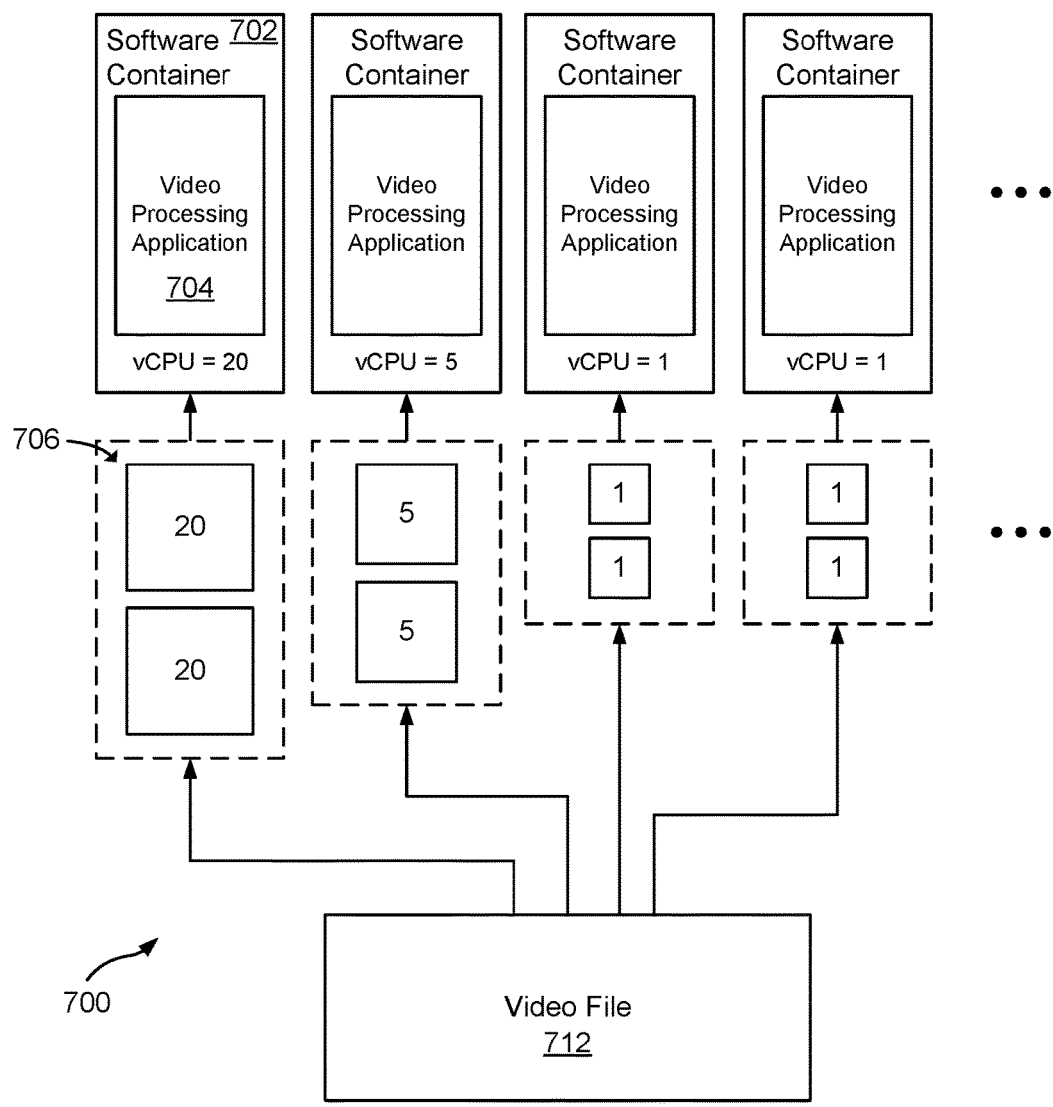
FIG. 7 is a diagram illustrating an example schematic for scheduling multiple video segments for processing using a software container according to an estimated amount of processing capacity used to process the video segments.

FIG. 7 is a diagram that illustrates an example method 700 for scheduling and/or queueing multiple video segments 706 for processing using a software container 702 that executes a video processing application 704 according to an estimated amount of processing capacity used to process the video segments 706, thereby reducing the number of software containers that may be needed to process a video file 712. For example, a software container 702 may be assigned multiple video segments 706 according to a processing capacity (e.g., virtual CPU units) allocated to the software container 702 that substantially corresponds with an estimated amount of processing capacity associated with the multiple video segments 706, and a scheduling scheme that assigns video segments to software containers so that the software containers are substantially fully utilized during the duration of time that the video segments are processed.

As an illustration, the number of software containers launched may be based in part on a calculation that considers the estimated amounts of virtual CPU units used to process video segments included in a video file 712 and a distribution scheme that distributes the video segments to software containers having allocated virtual CPU units that substantially correspond with the estimated amounts of virtual CPU units for the video segments so that the software containers may be substantially fully utilized until processing of the video segments is complete. Illustratively, the distribution scheme may be based on a time constraint, monetary budget constraint, or computing resources constraint. As a simplified example, a configuration of software containers included in a software container cluster used to process a video file 712 may be determined based in part on a distribution scheme that includes a time constraint (e.g., 2, 5, or 10 minutes) on processing the video file 712, a number of video segments to be processed (e.g., 20, 175, or 1,400 video segments), and the estimated amounts of virtual CPU units for the video segments (e.g., 1, 5, 20 virtual CPU units).

Figure 8:
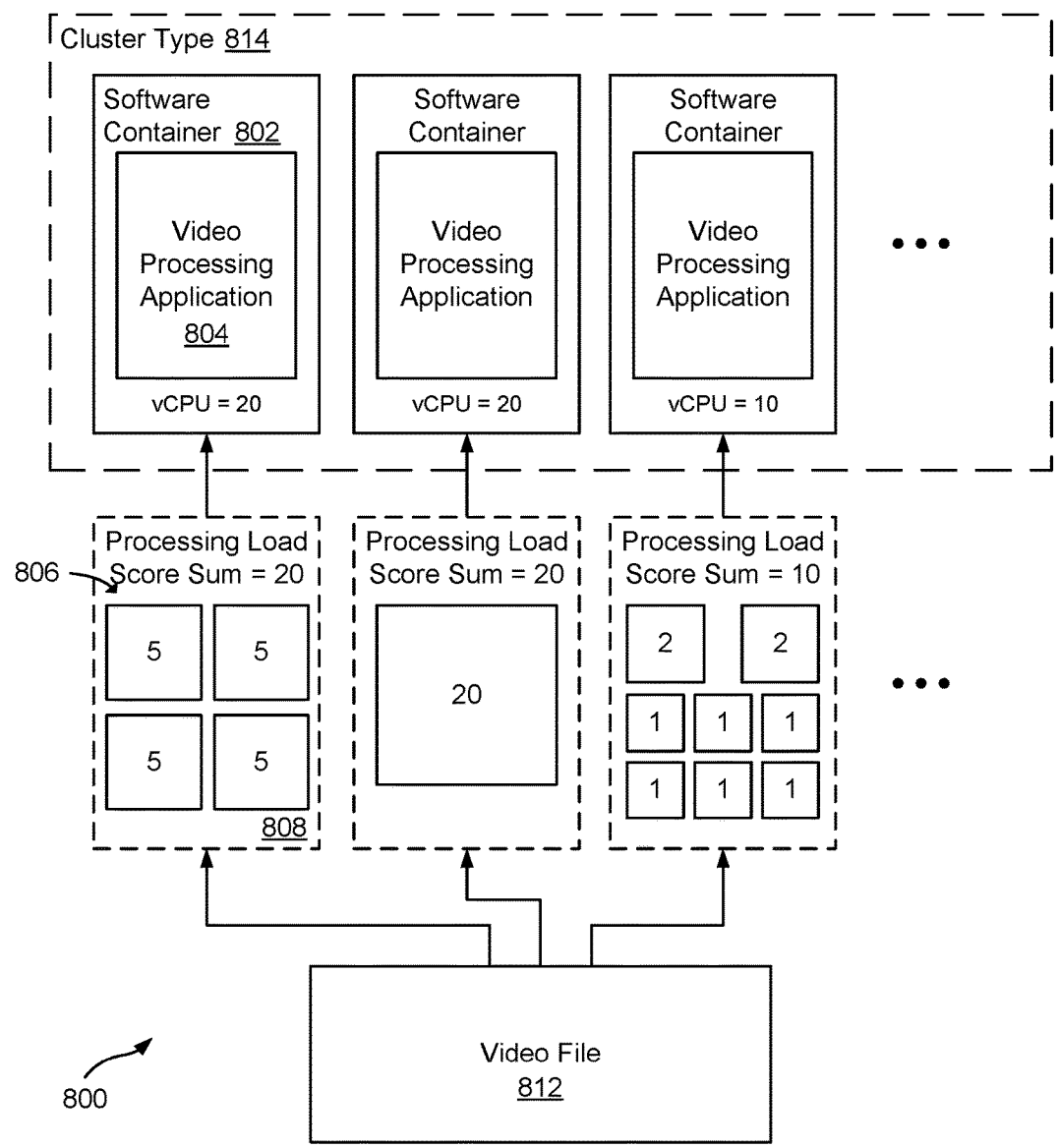
FIG. 8 is a diagram that illustrates an example schematic for scheduling video segments for processing using processing load scores.

FIG. 8 is a diagram illustrating an example method 800 for scheduling video segments 806 that have been assigned processing load scores for processing using a video processing application 804 executing in a software container 802. In one example, a processing load score may represent an estimated processing load (e.g., virtual CPU units) of an individual video segment 806. Each video segment 806 included in a video file 812 may be assigned a processing load score and the video segments 806 may be grouped according to a sum of the processing load scores so that the sum corresponds with an allocated amount of processing capacity for a software container 802.

As an illustration, video segments for a video file 812 may be assigned processing load scores that represent an estimated amount of processing capacity that may be used to process the video segments. The video segments 806 may then be grouped so that a sum of processing load scores for a group 808 may be substantially equal to or similar to a processing capacity value (e.g., virtual CPU capacity) for a software container 802. The video segments 806 included in the group 808 may then be assigned to the software container 802 for processing (e.g., encoding or transcoding).

In one example, different cluster types 814 of computing instances and software containers 802 may be used to process various types of video files 812. Video segments for a video file 812 may be distributed to one or more cluster types 814. Illustratively, a first cluster of computing instances and software containers may be configured to process video files 812 using a first codec (e.g., an H.264 codec), and a second cluster of computing instances and software containers may be configured to process video files 812 using a second codec (e.g., an H.265 codec). As another illustration, a first cluster of computing instances that execute the software containers 802 used to process video files 812 may be on demand computing instances (e.g., fixed rate and time computing instances), and a second cluster of computing instances may be spot computing instances (e.g., variable rate and short term computing instances).

Figure 9:
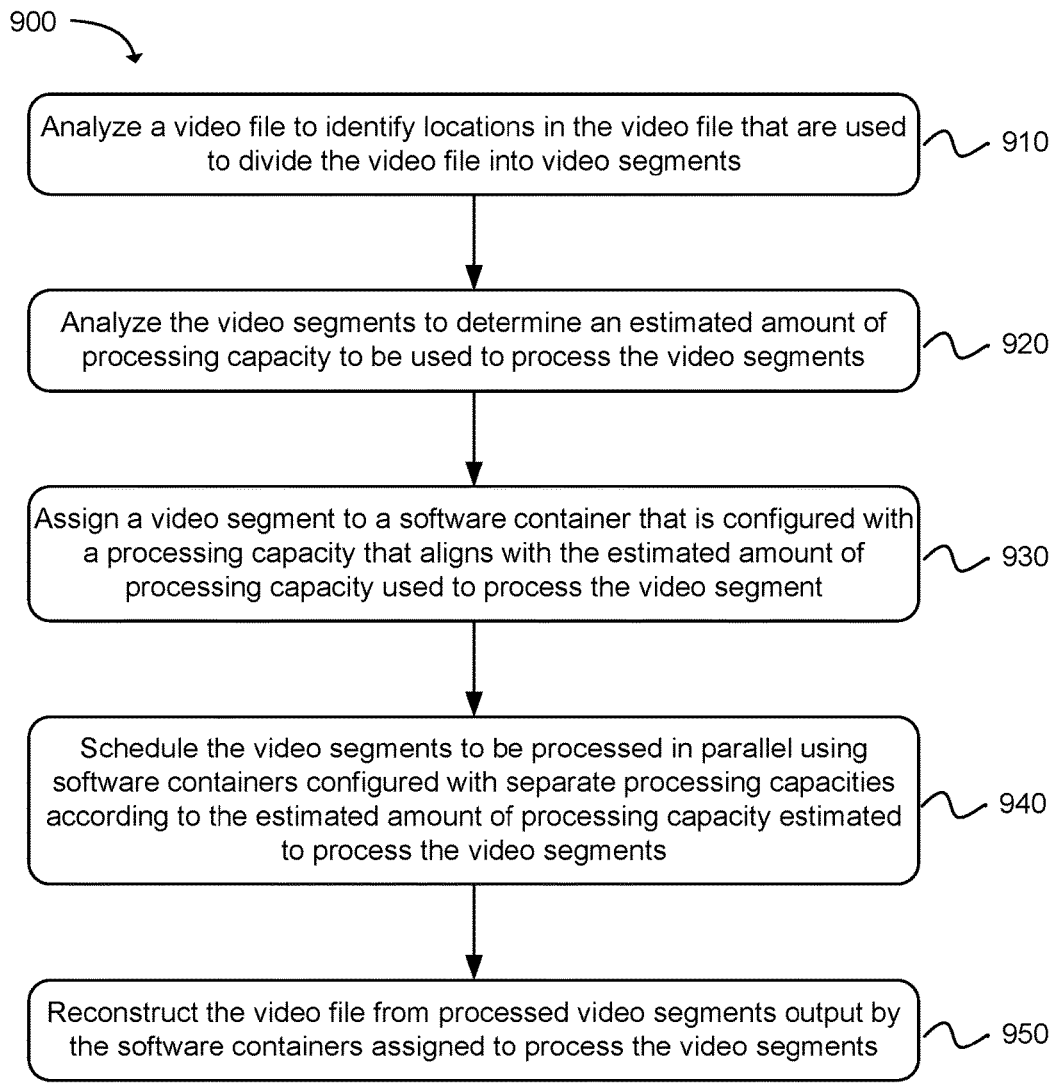
FIG. 9 is a flow diagram illustrating an example method for processing video files using software containers.

FIG. 9 is a flow diagram illustrating an example method 900 for processing video files using software containers. In one example, video segments of a video file may be processed using a scheduling service configured to distribute the video segments among software containers for processing so that each of the software containers may be substantially fully utilized and processing of the video segments completes close in time. Staring in block 910, a video file may be analyzed to identify locations in the video file that may be used to divide the video file into video segments. More specifically, the video file may be logically divided by identifying offsets in the video file that are associated with changes in video data, such as high motion video data and low motion video data. As an illustration, GOP structures may be identified in a video file and the video file may be logically divided into video segments by indexing GOP offsets that correspond with the GOP structures.

As in block 920, each of the video segments may be analyzed to determine an estimated amount of processing capacity to be used to process the video segments. For example, video encoding information for a video segment, such as motion vector data, bit rate data, GOP structure data, PSNR data, and/or codec data may be used to calculate an estimated amount of processing capacity for a video segment.

As in block 930, a video segment may be assigned to a software container that may be configured with a processing capacity that aligns with the estimated amount of processing capacity (load) used to process the video segment. Then, as in block 940, the video segments may be scheduled to be processed in parallel using the software containers, which may be configured with separate processing capacities according to the estimated amount of processing capacity estimated to process the video segments. The video segments may then be processed using the software containers. Finally, as in block 950, the video file may be reconstructed from the processed video segments output by the software containers assigned to process the video segments.

Figure 10:
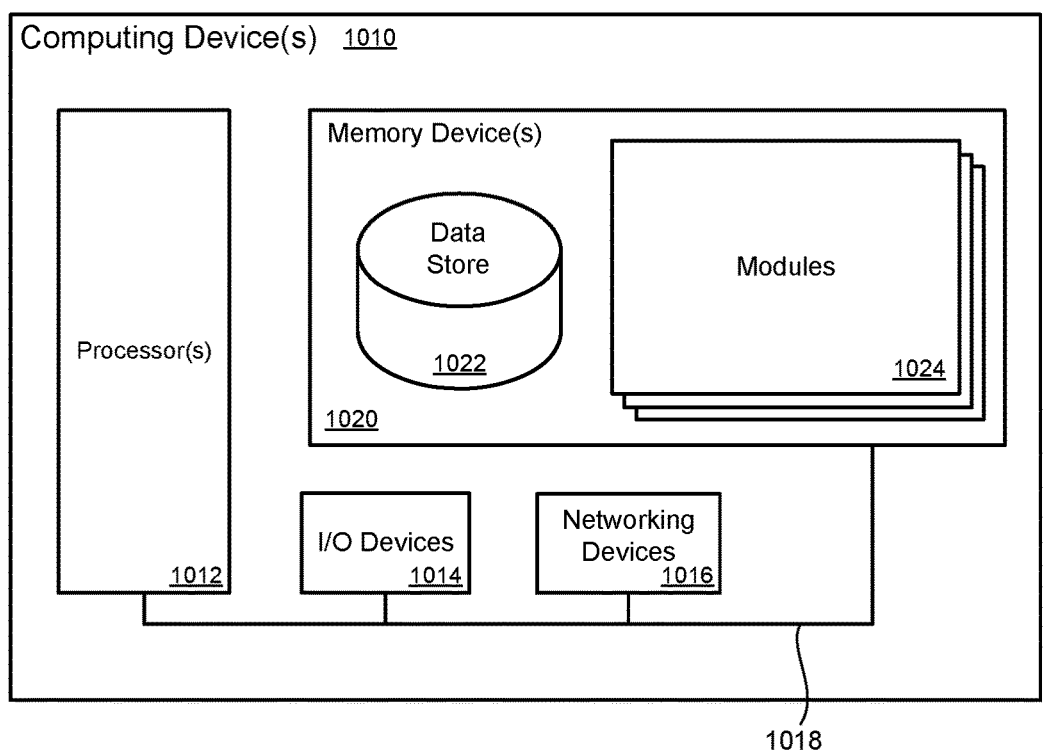
FIG. 10 is block diagram illustrating an example of a computing device that may be used to execute a method for processing video files using software containers.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. For example, the memory device 1020 may contain a file segmentation module, a processing capacity estimate module, a container scheduling module, a file construction module, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   divide a video file into video segments;
   analyze the video segments to determine an estimated processing load to process the video segments;
   distribute the video segments according to the estimated processing load of the video segments to software containers hosted on a computing instance, wherein the software containers provide an isolated environment for a video processing application by creating a virtual container on the computing instance in which the video processing application is contained;
   process the video segments using the video processing application contained in the software containers hosted on the computing instance; and
   reconstruct the video file using processed video segments output by the video processing application.

2. A system as in claim 1, wherein the memory device includes instructions that, when executed by the at least one processor, causes the system to further distribute the video segments to be processed in parallel using software containers configured with a uniform processing capacity that are included in a software container service, wherein the video segments are distributed among the software containers so that the software containers are fully utilized and processing of the video segments complete within a defined time window.

3. A system as in claim 1, wherein the memory device includes instructions that, when executed by the at least one processor, causes the system to:
   assign a processing load score to the video segments representing the estimated processing load of an individual video segment; and
   assign a plurality of video segments to a software container as a result of the video segments having a sum of processing load scores that is substantially equal to a processing capacity value for the software container.

4. A system as in claim 1, wherein the memory device includes instructions that, when executed by the at least one processor, causes the system to further:
   identify video encoding information for the video file; and
   calculate the estimated processing load used to process the video segments using the video encoding information.

5. A computer implemented method, comprising:
   receiving at a video processing service hosted in a computing service environment a request to process a video file;
   dividing the video file into video segments;
   analyzing the video segments to determine an estimated amount of processing capacity to be used to process the video segments;
   distributing the video segments to software containers hosted on a computing instance based at least in part on the estimated amount of processing capacity to be used to process a video segment, wherein the software containers provide an isolated environment for a video processing application by creating a virtual container on the computing instance in which the video processing application and video processing application dependencies are contained;
   processing the video segments using the video processing application contained in the software containers hosted on the computing instance; and
   reconstructing the video file using processed video segments output by the video processing application.

6. A method as in claim 5, further comprising analyzing the video file to identify locations in the video file that are used to divide the video file into the video segments by:
   identifying Group of Pictures (GOP) structures in the video file; and
   indexing GOP offsets that correspond with the GOP structures, thereby logically dividing the video file into the video segments.

7. A method as in claim 5, further comprising:
   launching a software container that includes the video processing application on a computing instance configured with virtual processing capacity that represents a time slot on a server processor; and
   allocating a portion of the virtual processing capacity to the software container that is equal to an estimated amount of processing capacity used to process the video segment.

8. A method as in claim 5, wherein distributing the video segments to the software containers further comprises assigning a video segment to a software container that is configured with a processing capacity that aligns with the estimated amount of processing capacity used to process the video segment.

9. A method as in claim 8, further comprising modifying the processing capacity of the software container assigned to process the video segment to correspond to the estimated amount of processing capacity used to process the video segment.

10. A method as in claim 5, further comprising:
    creating a task definition for processing a video segment, wherein the task definition specifies a software container image used to process the video segment, an amount of virtual computing capacity for the software container, and environment variables that are used to obtain and process the video segment; and
    passing the task definition to a software container service configured to manage the software container.

11. A method as in claim 10, further comprising:
    receiving the task definition at the software container service; and
    launching the software container as defined by the task definition.

12. A method as in claim 5, further comprising scaling a number of the software containers included in a software container cluster used to process the video segments in order to meet a customer specified time in which processing of the video segments is to be completed.

13. A method as in claim 5, further comprising scaling a number of the software containers included in a software container cluster used to process the video segments in order to meet a customer budget constraint on a monetary cost of the software containers.

14. A method as in claim 5, wherein processing the video segments further comprises transcoding the video segments.

15. A method as in claim 5, wherein processing the video segments further comprises encoding the video segments.

16. A non-transitory machine readable storage medium having instructions embodied thereon, the instructions when executed by at least one processor:
- divide an imaging file into imaging segments;
- analyze the imaging segments to determine an estimated processing load to process the imaging segments;
- distribute the imaging segments according to the estimated processing load of the imaging segments to be processed in parallel using software containers hosted on a computing instance, wherein the software containers provide an isolated environment for a processing application by creating a virtual container on the computing instance in which the processing application and processing application dependencies are contained;
- process the imaging segments using the processing application contained in the software containers hosted on the computing instance; and
- reconstruct the imaging file using processed imaging segments output by the processing application.

17. A non-transitory machine readable storage medium as in claim 16, wherein the instructions that when executed by the at least one processor further schedule the imaging segments to be processed in parallel so that the software containers are fully utilized and processing of the imaging segments complete within a defined time window.

18. A non-transitory machine readable storage medium as in claim 16, wherein the instructions that when executed by the at least one processor further schedule the imaging segments using a scheduling service configured to distribute the imaging segments among the software containers for processing so that the software containers is fully utilized and processing of the imaging segments completes close in time.

19. A non-transitory machine readable storage medium as in claim 16, wherein the instructions that when executed by the at least one processor further transfer the imaging file reconstructed from the processed imaging segments to a data store that is accessible to an owner of the imaging file.

\* \* \* \* \*